United States Patent
Ramakrishnan et al.

(10) Patent No.: US 8,571,285 B2
(45) Date of Patent: Oct. 29, 2013

(54) AUTOMATED RIB ORDERING AND PAIRING

(75) Inventors: Sowmya Ramakrishnan, Kendall Park, NJ (US); Christopher V. Alvino, Allenwood, NJ (US); Dijia Wu, North Brunswick, NJ (US); David Liu, Princeton, NJ (US); Shaohua Kevin Zhou, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 143 days.

(21) Appl. No.: 13/274,515

(22) Filed: Oct. 17, 2011

(65) Prior Publication Data

US 2012/0106810 A1 May 3, 2012

Related U.S. Application Data

(60) Provisional application No. 61/407,965, filed on Oct. 29, 2010.

(51) Int. Cl.
*G06K 9/00* (2006.01)
*A61B 5/08* (2006.01)

(52) U.S. Cl.
USPC .......................................... 382/128; 600/533

(58) Field of Classification Search
USPC ......... 382/128, 129, 130, 131, 132, 133, 134, 382/293; 378/4, 8, 21–27, 101, 901; 600/407, 410, 411, 425, 427, 533, 538; 250/363.02, 363.04; 128/920, 922
See application file for complete search history.

(56) References Cited

U.S. PATENT DOCUMENTS 7,369,693 B2 * 5/2008 Shen .............................. 382/128
8,170,306 B2 * 5/2012 Yu et al. ........................ 382/128

OTHER PUBLICATIONS

A. Kiraly et al., "A novel visualization method for the ribs within chest volume data," In Medical Imaging: Visualization, Image-Guided Procedures, and Display, vol. 614, 2006.
T. Klinder et al., "Automated model-based rib cage segmentation and labeling in CT images," in MICCAI, LNCS 4792, pp. 195-202, 2007.
Y. Kurihara et al., "The ribs: Anatomic and radiologic considerations," Radiographics, 19: pp. 105-119, Jan. 1999.
J. Lee et al., "Estimation of anatomical locations using standard frame of reference in chest CT scans," Proceedings of the Conference of IEEE Engineering in Medicine and Biology Society, pp. 5809-5812, Sep. 2009.
H. Li et al., "Automatic rib positioning method in CT images," 4th International Conference on Bioinformatics and Biomedical Engineering, (DOI: 10.1109/ICBBE.2010.5517232): Jun. 1-4, 2010.
S. Ramakrishnan et al., "Automatic three dimensional rib centerline extraction from CT scans for enhanced visualization and anatomical context," SPIE Conference on Medical Imaging (accepted), Feb. 2011.

(Continued)

*Primary Examiner* — Abolfazl Tabatabai (57) ABSTRACT

Ribs are automatically ordered and paired. After ordering ribs on each side, magnetic and spring functions are used to solve for rib pairing. The magnetic function is used to constrain possible pairs across sides, and the spring function is used to maintain the order on each side while accounting for missing or fused ribs.

20 Claims, 3 Drawing Sheets

(56) References Cited

OTHER PUBLICATIONS

H. Shen et al., "Tracing based segmentation for the labeling of individual rib structures in chest CT volume data," in MICCAI, pp. 967-974, Springer-Verlag, 2004.

H. Shen et al., "A thoracic cage coordinate system for recording pathologies in lung CT volume data," In IEEE Nuclear Science Symposium Conference, vol. 5, pp. 3029-3031, 2003.

J. Shi et al., "Pulmonary nodule registration in serial CT scans based on rib anatomy and nodule template matching," Medical/physics, 34(4), pp. 1336-1347, 2007.

J. Staal et al., "Automatic rib segmentation and labeling in computed tomography scans using a general framework for detection, recognition and segmentation of objects in volumetric data," Medical Image Analysis, 11:1, pp. 35-46, 2007.

* cited by examiner

AUTOMATED RIB ORDERING AND PAIRING

RELATED APPLICATIONS

The present patent document claims the benefit of the filing date under 35 U.S.C. §119(e) of Provisional U.S. Patent Application Ser. No. 61/407,965, filed Oct. 29, 2010, which is hereby incorporated by reference.

BACKGROUND

The present embodiments relate to ordering and/or pairing of ribs. In particular, ribs represented in scan data are automatically labeled.

Ribs from medical scans of the chest are routinely viewed by radiologists. For example, computed tomography (CT) scans are used to view ribs for oncology evaluation or trauma reporting. Since ribs span through several axial image slices in oblique angles, the ribs may be difficult to view with a sufficient understanding of overall structure.

Computer aided automatic labeling of the ribs may be valuable to expedite reading and important in related applications, such as rib cage visualization, nodule registration, and pathology recording. Ribs serve as a frame of reference for intra/inter subject evaluations and facilitate registration across multiple scans for pulmonary nodule studies. The natural ordering and pairing of ribs are useful features in accurate localization and recording of lesions and pathologies of the lung. Correct labeling of the ribs may aid precise delineation of rib metastases and fracture locations.

The clavicles, xiphoid process, and sternal angle have been traditionally used as anatomic landmarks for rib counting in CT scans. Ribs are often ordered based on their relative spatial relationships and length ratios and labeled using their relative location with respect to the spine. In one approach, left and right side ribs are identified by comparing each rib centerline's centroid to the overall center of gravity of all the centerlines. Then, from each side, the closest centerlines above and below the longest centerline are found using the axial position of the constituting ridge voxels, repeating the scheme in tandem to obtain rib numbers. In another approach, the heuristic that the axial slices typically containing the apex of the lungs also contain the second pair of ribs is used. The second rib pair is identified from the segmented lung apex and the spine profile, following which other ribs are labeled sequentially while using the rib interval to identify possible missing ribs. In yet another approach, the first rib is identified as a sloping line that appears in a key sagittal plane image, and other ribs are detected as small ovals under the top rib.

These approaches may suffer from anatomic variability and fail under conditions such as scoliosis that alter the curvature of the spine, distorting the structural regularity of the rib cage. Ribs fractured due to trauma or pathology, missing ribs due to detection errors, or anatomically fused ribs may distort average rib intervals, resulting in problems with some of the approaches. Rib length ratios are not reliable for short ribs, such as the twelfth rib. The assumption about the second rib pair being closer to the apex of the lungs does not always hold true. In contrast enhanced CT images, often the contrast agent misleads detection of the top rib and subsequent ribs cannot be placed correctly. Many of the heuristics do not operate with abdominal and partial thoracic scans because of partial ribs and lack of sufficient spine context.

BRIEF SUMMARY

By way of introduction, the preferred embodiments described below include a method, system, instructions, and computer readable media for rib ordering and/or pairing. After ordering ribs on each side, magnetic and spring functions are used to solve for rib pairing. The magnetic function is used to constrain possible pairs across sides, and the spring function is used to maintain the order on each side while accounting for missing or fused ribs.

In a first aspect, a method for automated rib ordering and pairing is provided. A spine location designation and rib location designations for a plurality of ribs are received. A processor determines a left side or a right side of the spine location designation for each of the rib location designations. For the rib location designations on the left side, the processor orders the rib location designations sequentially. For the rib location designations on the right side, the processor orders the rib location designations sequentially. The processor pairs the rib location designations on the left side with the rib location designations on the right side as a function of the ordering, a spring cost function, and a magnetic cost function.

In a second aspect, a non-transitory computer readable storage medium has stored therein data representing instructions executable by a programmed processor for rib pairing. The storage medium includes instructions for receiving first and second lists of positions of ribs represented in data for left and right sides of a patient, respectively, and matching ribs on the right side with ribs on the left side as a function of a model of a distance-based affinity between ribs on the left and right sides based on a magnetic attraction energy and of an axial ordering from the lists based on a spring system enforcing the ordering.

In a third aspect, a system is provided for automated rib ordering and pairing. A memory is configured to store scan data representing ribs of a patient. A processor is configured to determine an order of the ribs on each of first and second sides and to pair the ribs of the first side with the ribs of the second side as a function of the order on each of the first and second sides and as a function of magnetic and spring functions.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Computer aided automatic labeling of ribs may expedite rib reading routinely performed by radiologists for oncology evaluation or trauma reporting. The automated rib reading may assist in rib cage visualization, registration for pulmonary nodule studies, or pathology localization.

The ribs are labeled using a reliable algorithmic approach that orders ribs on either side of the rib cage and subsequently pairs contra lateral left-right ribs based on this ordering. For ordering, each rib point is modeled as an observer viewing adjacent ribs within a specified neighborhood. The axial positions of the ribs are obtained within a least squares framework to obtain rib ordering.

Subsequently, pairing is achieved by optimizing distance-based affinity between opposite side ribs, constrained by the ordering. The ribs on the same side are held in order by a spring system, and the distance-based affinity between contra-lateral ribs is treated as magnetic attraction energy. Constraining the total potential energy of the spring-magnet system to equilibrium may establish correct rib pairing subject to the ordering and enables accurate rib labeling.

The ribs are labeled independent of the rib centerline extraction method. Rib ordering and pairing may work reliably even when ribs are missing or broken.

Figure 1:
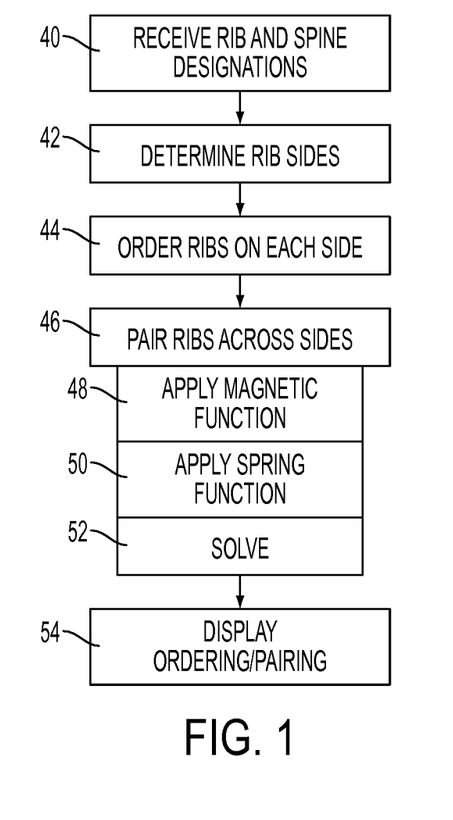
FIG. 1 is a flow chart diagram of one embodiment of a method for automatically ordering and pairing ribs.
Figure 2:
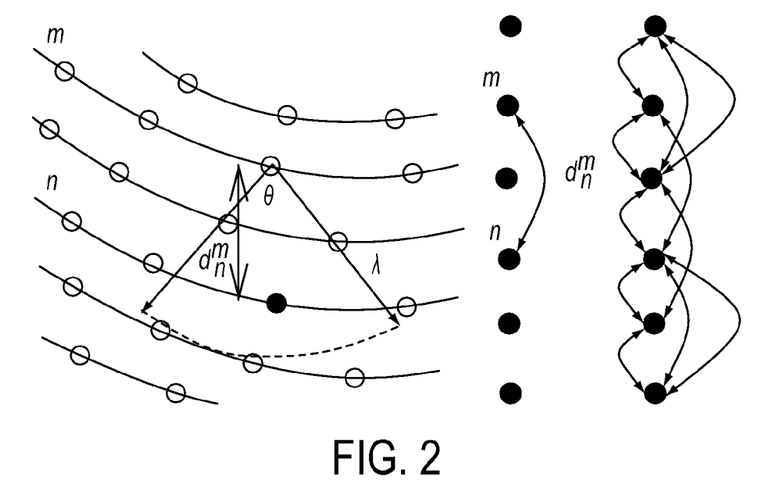
FIG. 2 is a graphical illustration of rib ordering according to one embodiment.

FIG. 1 shows a method for automated rib ordering and pairing. Rib labeling involves three components: (a) side determination, (b) axial ordering and (c) rib pairing. Additional, different, or fewer acts may be performed. For example, act 46 is performed without acts 40, 42, and/or 44. Acts 48, 50, and 52 represent one conceptual break-down of act 46. Other break-downs may be used.

Figure 6:
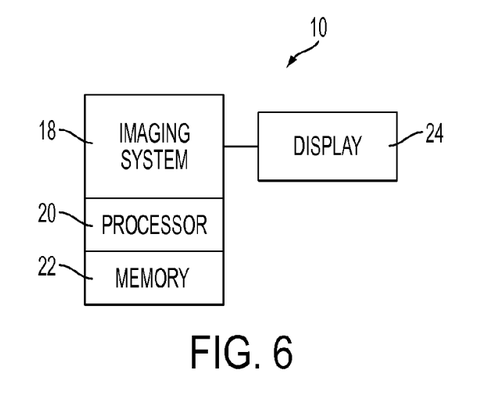
FIG. 6 is a block diagram of one embodiment of a system for pairing ribs.

The acts of FIG. 1 are implemented by the system 10 of FIG. 6 or a different system. The acts are performed in the order shown or a different order.

In act 40, a spine location designation and rib location designations for a plurality of ribs are received. The designation is an indication or assignment of data. Scan data representing one or more planes or a volume may include response from different tissues, including bone. The response from bone, such as the spine and ribs, is isolated or used to find the locations within the scan plane, planes, or volume of the spine and ribs. For example, rib and spine locations are segmented from other locations. As another example, data representing intensity or other information from the ribs and spine are segmented.

In one embodiment, the spine and rib location designations are spine and rib centerlines. Using region growing, curve fitting, or another approach, the centers (e.g., lines or curves) of the ribs and spine are determined. The set of rib centerlines, $C_k$, indexed k=1, 2, ..., T, are extracted by any rib centerline extraction method. Further information may be received, such as the spine correspondence point for each rib centerline (i.e., the point of intersection of the rib centerline with the spine). In other embodiments, extra or false centerlines are detected, and ordering and labels are assigned to the true rib centerlines and not to the extra or false centerlines.

The rib and spine location designations are received by scanning the patient. Using computed tomography, ultrasound, magnetic resonance, positron emission, single photon emission, x-ray, or other scanning, the response of bone, with or without other tissue, is obtained from a patient. The received data is processed to identify the spine and rib designation locations within the scanned region.

In another embodiment, the rib and spine location designations are received by data transfer or from storage. For example, scan data from a previously performed scan is acquired from a picture archival or other data repository. As another example, the location designations themselves are received from another process or from storage. The reception may be by transfer over a network.

In act 42, the side of the spine on which each rib is located is determined. Each rib location designation is on the left or right side of the spine location designation when viewed from the front or back.

A processor may determine the side based on the received location designations. In one embodiment, the location designations are lines or curves. In other embodiments, the location designations are regions or volumes. In yet other embodiments, the location designations are a center of gravity or other point. To determine the side, the processor calculates a centroid for each of the ribs or corresponding rib location designations. The centroid of the rib centerline is computed from the set of centerline points constituting the rib. The centroid is located within the scan volume. A sagittal position of the centroid, based on the scan being centered on the patient's spine, is determined for each of the rib location designations relative to the spine location designation. The ribs are sorted into a set of left ribs L and a set of right ribs R, where |L|+|R|=T.

In act 44, the rib location designations are ordered sequentially. The processor orders the rib location designations on the right side and orders the rib location designations on the left side. The ordering for one side is independent of ordering for the other side. The ribs are ordered from top to bottom, bottom to top, or some other sequence.

To order the ribs, adjacent rib location designations are identified for each of the rib designation locations. Assuming a vertical or given orientation of the spine, the ordering is done as a function of axial distance. The axial dimension is substantially along the spine or spine location designation. Substantially accounts for the curvature of the spine and possible angling of the scan away from ideal due to patient positioning errors.

Figure 3:
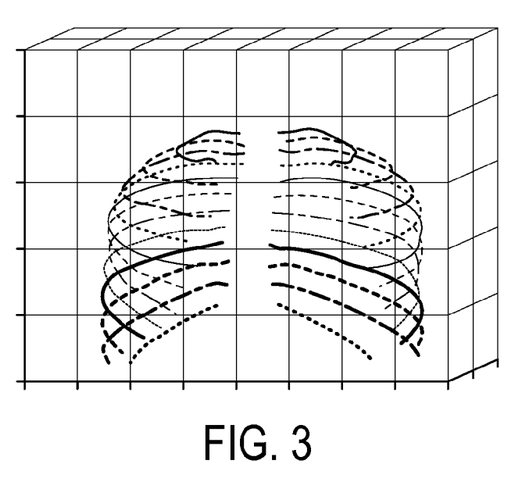
FIGS. 3-5 are example images of paired ribs.

In one embodiment, one or more points are assigned or selected for each rib. FIG. 3 shows the rib location designations as lines. Along each line, one or more sample points (hollow circles) are selected. Each point of a given rib is treated as an observer able to view points of other ribs on the same side (e.g., left side). A neighborhood is defined for viewing. Any shape may be used. In the embodiment shown in FIG. 3, the neighborhood is defined by a radius A and a viewing angle θ(e.g., λ=75 mm and θ=45 degrees, but other values may be used). The angle is along the axial dimension, but may be oriented in an opposite or other direction.

Let G={V, E} be a multigraph without self loops, with a set of vertices V (i.e., rib point) and edges E (i.e., link between ribs or rib points). Each rib, k, is treated as a node $V_k \epsilon V$. An edge $e_{mn} \epsilon E$ is created when a point from one rib (e.g., rib m) is able to view a point in another rib (e.g., rib n). The weight of the oriented edge is the relative axial distance (e.g., $d_n^m$) between the two points. From G, the neighbors of every vertex (i.e., rib point) are determined.

The set of neighbors $N(v_k)$ of a vertex $v_k$ denotes the ribs that are adjacent to rib k based on axial distance. This adjacency may or may not include an intervening rib. Given each vertex and its neighbors, the connected component of vertices is formed from the graph. FIG. 3 shows this multi-graph on the right and the identification (middle of FIG. 3) of part of the multi-graph associated with the example on the left. Each connected component (CC) has all the ribs adjacent to at least one other rib in the set. When no rib is missing, there is only one CC, such as shown in FIG. 3. When ribs are missing, there may be multiple, separate CCs because of disconnected sub graphs.

For ordering the ribs, their relative axial distances are calculated. The distance is between two points along the axial dimension, but without a fixed frame of reference. The distances between adjacent rib location designations are provided in the multi-graph. The distances may be represented as a matrix. The multigraph information is used to set up a linear system of equations Az=D, where A is the graph incidence matrix with |E| rows and |V| columns, D is a vector of the relative axial distances between rib points, and Z is a vector containing the estimated axial positions of the ribs. Each equation of the system encodes the relative axial distance of between ribs (e.g., rib m to rib n) through the difference operator. In each row of the incidence matrix, the innode of an edge (e.g., $e_{ms}$) is marked by '+1' at the mth column and outnode by '−1' at the nth column. The beginning of each edge is marked with +1 and the end of each edge is marked with −1. The corresponding row in D vector holds the relative axial distance (edge weight) d. The actual rib indices are mapped onto sequential left and right rib indices for this matrix notation.

The linear system is over determined and A is rank deficient because only relative distances are encoded. The absolute axial position of each rib is resolved as a function of the relative distances. By pinning the absolute axial position for any one member (rib) of each CC, the degree of freedom is curtailed, and A is forced to full rank. Any rib may be pinned without loss of generality. For example, the member that had the centerline point with the least axial position is chosen in each CC. A new equation is added to the linear system, making an entry of '+1' corresponding to the chosen rib's column in A, and, for the same row in D, the minimum z-position value is used. The linear system is solved using the pseudo inverse of A to estimate $Z=A^{\dagger}D$. The vector z holds the correct ordering of the ribs in terms of the axial position $Z_k \in Z$ for each rib k.

In one embodiment, only one rib point for each rib k is selected. In an alternative embodiment, the rib points are sampled along each rib centerline from the spine. Any sampling distance may be used, such as every 2.5 cm along the centerline. The samples may be selected randomly from each rib to add more pairwise constraints between neighboring ribs for more robust results. The axial distances are calculated for each of these points. For the multigraph, the weight of the edge between two ribs is set as the average of the axial distances between the sampled points along the two ribs, and the ordering is performed as a function of the average distance associated with multiple points and corresponding ribs. In another example, multiple edges are constructed between two ribs and the weight of each edge corresponds to the axial distance of every pair of sampled points along the two ribs. The extra edges provide more constraints in the linear equations $Z=A^{\dagger}D$ and therefore may make the system more robust.

The ordering, such as the vector z, is given as an input to the pairing. The pairing operation receives lists of rib positions as the order. A list is provided for the right side and another list is provided for the left side. The absolute positions for the two sides may or may not be aligned.

In act 46, the rib location designations on the left side are paired with the rib location designations on the right side. Since ribs may be missing, broken, fused or otherwise arranged differently, the pairing is robust to account for such differences. The ordering, a spring cost function, and a magnetic cost function are used to provide for robust pairing. A processor automatically pairs the ribs from different sides without user input.

The pairing is a function of the ordering on both of the sides. The pairing may use a relative order, such as 1 through T. Alternatively, distance information is used as or as part of the ordering. For example, the absolute position of ribs on each side is used as the ordering (e.g., rib 1 at 0 mm, rib 2 at 25 mm, rib 3 at 48 mm . . . for each side). As another example, the relative positioning may be used. The absolute positions are for each side separately. The left and right sides may both have ribs at a particular axial distance, but that distance may not correspond to the same location along the spine or axial dimension.

In one embodiment, from the rib ordering, a set of ordered rib centerlines for each of the left and right sides of the rib cage is denoted by set of absolute positions $Z^l$ for the left side and for the right side by $Z^r$. The next task is to correctly pair left and right side ribs. The left and right ribs are assigned as nodes i and j on either side of a bipartite graph. The matching is to be solved subject to the ordering of the nodes. Connecting edges cannot cross one another.

The pairing is solved by modeling the system as a distance-based affinity between opposite side ribs as magnetic attraction energy and the axial ordering as a spring system holding the ribs in order. The model matches the ribs on the right side with ribs on the left side. Constraining the total potential energy of the spring-magnet system to equilibrium results in establishing correct pairing of left and right ribs. The spring energy balances the attraction energy by expanding and/or contracting the individual springs to lock in the node pairings.

As represented by act 48, the matching is weighted by a distance affinity between rib location designations on opposite of the sides. The magnetic cost function represents this distance affinity. The magnetic cost function may be separated into left and right side magnetic functions, but an overall or magnetic function for both sides may be used. Any magnetic function may be used.

In one embodiment, the distance-based affinity for a rib i∈L corresponding to a rib j∈R is computed. Every centerline point of i is reflected with respect to the spine centerline. This is done by performing a local line fit of the spine centerline points around the spine correspondence point of rib i (i.e., intersection of the rib centerline with the spine centerline). The planar reflection of the rib with respect to this line fit is computed. Based on the distance of each reflected point of i to its closest point on j, a cumulative affinity score $y_{ij}$ is computed. Similarly for every rib, the affinity score with respect to each opposite side rib is computed and accumulated into the affinity matrix Γ of |L| rows by |R| columns. In one embodiment, the distance between i and j across a central coronal plane is:

$$p_{ij}=\operatorname{sqrt}((z_i^l-z_j^r)^2+\rho^2) \quad (1)$$

where $z_i \in Z^l$, $z^r \in Z^r$ denote axial positions and the constant ρ denotes constant displacement between the left and right sides. Since the input may contain extra rib centerlines (in other words, |L|+|R|>T), a subset of T centerlines being the true ones is hypothesized, while the remaining centerlines are spurious. The algorithm may be run several times over all possible hypotheses, and the final result is selected based on the hypothesis resulting in the lowest total energy.

Modeling the affinity between the left and right ribs by a magnetic attraction energy provides:

$$U_{mag} = \sum_{i \in L, j \in R} \left(-\gamma_{ij} / \left(\operatorname{sqrt}\left((z_i^l - z_j^r)^2 + \rho^2\right)\right)\right) \quad (2)$$

Other affinity or magnet type functions may be used.

As represented by act 50, the axial ordering is weighted by the spring cost function. The spring cost function maintains the ordering while allowing flexibility in the model for different spacing, missing ribs, or other variability. The spring cost function may be separated into left and right side spring functions. Any spring function may be used.

In one embodiment, the ordering is modeled by a spring system whose energy is given by:

$$U_{spr} = \sum_{i=1}^{|L|-1} 1/2k(z_{i+1}^l - z_i^l - q_i^l)^2 + \sum_{j=1}^{|R|-1} 1/2k(z_{i+1}^r - z_i^r - q_i^r)^2 \quad (3)$$

where k is the spring constant and q is the relative displacement between two consecutive ribs. The first term of $U_{spr}$ signifies the left side spring system and the second term corresponds to the right side spring system.

As represented by act 52, an objective function is solved to match the rib pairs. The objective function is a sum of the left and right side magnetic functions and the left and right side spring functions. To solve the objective function from the model, the magnetic and spring energy gradients are computed with respect to the right and left sides. The left side magnetic gradient $\nabla U_{mag}^l$ is provided as:

$$\delta U_{mag}/\delta z_m^l = \sum_{i \in L, j \in R} (\gamma_{ij}\delta(i,m)(z_i^l - z_j^r))/(z_i^l - z_j^r)^2 + \rho^2)^{3/2} \quad (4)$$

where δ is the kronecker delta function. Similarly for the right side, magnetic gradient $\nabla U_{mag}^r$ is provided as:

$$\delta U_{mag}/\delta z r_n = \sum_{i \in L, j \in R} (\gamma_{ij}\delta(j,n)(z_j^r - z_i^l))/(z_i^l - z_j^r)^2 + \rho^2)^{3/2} \quad (5)$$

The spring gradient for the left side denoted by $\nabla U_{spr}^l$ is provided as:

$$\delta U_{spr}/\delta z_m^l = \sum_{i=1}^{|L|-1} k(z_{i+1}^l - z_i^l - q_i^l)(\delta(i+1,m) - \delta(i,m)) \quad (6)$$

in which the first term exists only when m>1 and the second term exists only when m<|L|. Similarly, the gradient for the right side spring system $\nabla U_{spr}^r$ is provided as:

$$\delta U_{spr}/\delta z_n^r = \sum_{j=1}^{|R|-1} k(z_{j+1}^r - z_j^r - q_j^r)(\delta(j+1,n) - \delta(j,n)) \quad (7)$$

of which the first term exists only when n>1 and the second term exists only when n<|R|. Pairing is achieved by solving:

$$\nabla U_{mag}^l + \nabla U_{mag}^r + \nabla U_{spr}^l + \nabla U_{spr}^r = 0 \quad (8)$$

The objective function is solved by gradient descent. In one example, the spring constant k=1 and displacement ρ=10 mm, but other values may be used. The rib pairings are obtained out of ($Z^l$, $Z^r$) by windowing out locked axial positions. One possible pair is selected. The processor then solves through combinations of other pairs sequentially.

In act 54, the pairings and/or ordering are output. The output may be a list. In one embodiment, an image of ribs is displayed. The ribs are labeled as a function of the pairing. An annotation may be used. Color coding may be used. FIG. 3 shows a grayscale representation of an image of rib centerlines generated with color coding. Any rendering may be used. The outer surface of the bones rather than just the centerlines may be rendered. The image is of the bones alone, but may include tissue information.

In one embodiment, a two-dimensional image is generated. Any ribs within the imaging plane may be labeled, such as through color coding or annotation.

The algorithm may be evaluated based on a plurality of CT datasets, such as 100 CT datasets of slice spacing ranging from 0.6 to 2 mm, slice thickness varying from 1 to 3 mm, low/high dose scans and under a variety of reconstruction kernels. Each volumetric image may include several axial images of size 512×512 with in-plane resolution ranging from 0.56 to 0.873 mm. The set may include a mix of full body, thoracic and abdominal scans, of subjects with rib fractures, rib metastases and also cases without significant rib abnormalities.

The inputs are the spinal canal centerline and rib centerlines. Each rib centerline consists of a sequence of three dimensional rib centerline points in world geometry arranged in order from the spinal end towards the sternal end. After side determination, each centerline is sampled at a spatial frequency of 2.5 cm to produce the observer points.

FIG. 3 shows the result from ordering and pairing for a full rib cage with final pairings indicated by centerlines shown with the same color (same grayscale) on either side of the rib cage.

Figure 4:
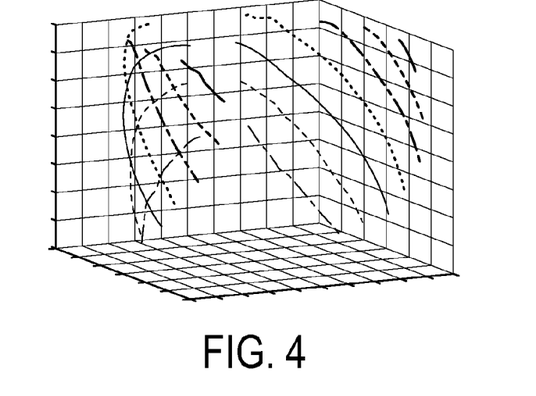

FIG. 4 shows the result for a partial rib cage in an abdominal scan. In this example, the volumetric image contains only the lower part of the rib cage with ribs 6 through 12 on either side present. The challenges here are that the upper part of the spine is not contained within the image and ribs 6 through 9 are present only partially, truncated by the top of the volume boundary. In FIG. 4, the ribs have been ordered and paired correctly in spite of these limitations.

Figure 5:
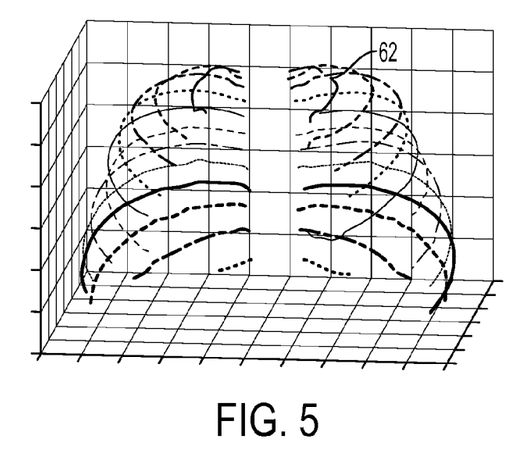

In FIG. 5, the first rib on the right side has been traced as two different segments because of a gap 62 in the rib centerline. Such gaps are often caused by degenerative pathology limiting the tracing algorithms from extracting the rib in its entirety. Both of these segments are correctly ordered as rib 1 and paired with the same corresponding first left rib.

Out of the 100 datasets evaluated (about 1100 pairings), 15 erroneous pairings occurred. The erroneous pairings were caused mainly by non-ribs, such as the scapula or clavicle, present among the rib centerlines input to the algorithm. If the non-rib centerlines are present outside of the rib cage axial range, these centerlines may not affect the correct pairing result.

The pairing information may be used for location identification, trauma information, or to otherwise assist physicians or further automated processing. In one embodiment, the pairing information is used for measurements. Paired ribs may be compared. The differences between left and right side paired ribs are measured. The differences between ribs on each side may be compared where the pairing and ordering allow similar comparisons on each side.

FIG. 6 shows a system 10 for automated rib ordering and pairing. The system 10 includes an imaging system 18, a processor 20, a memory 22, and a display 24. Additional, different, or fewer components may be provided. For example, the system 10 includes a user interface. In one embodiment, the system 10 is a medical diagnostic imaging system. For example, the imaging system 18 is a computed tomography system with a C-arm, x-ray source, and detector as well as the processor 20, memory 22, and display 24. In alternative embodiments, the imaging system 18 is a magnetic resonance, ultrasound, positron emission, photon emission, x-ray, or other imaging system for scanning a patient. In other embodiments, the processor 20 and/or memory 22 are part of a workstation or computer different or separate from the imaging system 18. The workstation is adjacent to or remote from the imaging system 18.

The imaging system 18 causes a scan of an internal region of a patient and generates data representing the region as a function of the scanning. The data used by the processor 20 for rib ordering and pairing is at any stage of processing. For example, the data is projection data prior to reconstruction. As another example, the data is reconstructed data representing a three-dimensional object. The data may include segmentation information, such as including identification of bone locations and/or centerlines. Alternatively, the data represents the scanned region and the processor 20 applies segmentation.

In another embodiment, the imaging system 18 is a workstation or computer for processing previously acquired data. Data is acquired by transfer from another device or from storage (e.g., PACS system). For example, the data is received from a data archival system or on a network.

The processor 20 is one or more general processors, digital signal processors, application specific integrated circuits, field programmable gate arrays, controllers, analog circuits, digital circuits, server, graphics processing units, graphics processors, combinations thereof, network, or other logic devices for ordering and pairing. A single device is used, but parallel or sequential distributed processing may be used. The processor 20 is configured by hardware and/or software to perform the various acts discussed herein.

The processor 20 is configured to determine an order of the ribs. The order is determined on both sides of the spine. Alternatively, the order is determined on one side. Any ordering process may be used, such as labeling ribs based on connected regions or region growing. In one embodiment, one or more distance based metrics are used to determine the relative relationship of ribs to each other. An axial or distance along one or two dimensions is measured to order the ribs. In other embodiments, the rib order is provided to the processor 20.

The processor 20 is configured to pair the ribs of the one side with the ribs of another side. The ribs generally occur in pairs, such as from the same location on the spine. Due to breakage, fusing, partial scanning, or other variation, the pairing may be different than mere matching of the ordering. The pairing is a function of the order on each of the sides, but also a function of magnetic and/or spring functions. The order may be represented as relative or absolute position on each side.

The processor 20 is configured to pair with the magnetic function modeling a distance-based affinity between the ribs on the different sides. The magnetic function attempts to minimize the axial, lateral, or both distance between any given rib on one side and the possible matches on the other side of the spine. The ribs on opposite sides with the closest distance have a greater affinity to be paired.

The processor 20 is configured to pair with the spring function maintaining the order on each of the sides. The spring function accounts for distance variation, such as due to fused or missing ribs, while maintaining the order. The order of the ribs on the same side is maintained while accounting for distance variation.

The magnetic and spring functions may be handled globally or separated into left and right side functions. The functions are combined to pair. For example, the processor 20 solves for a sum of gradients of the left and right side magnetic functions and the left and right side spring functions.

The memory 22 is a tape, magnetic, optical, hard drive, RAM, buffer or other memory. The memory 22 stores the scan data from one or more scans, at different stages of processing, and/or as a rendered image. In one embodiment, the memory 22 stores segmented information, such as rib and spine centerline information with or without other scan data. The memory 22 may store data in different stages of processing, such as storing order or distance information.

The memory 22 is additionally or alternatively a non-transitory computer readable storage medium with processing instructions. Data representing instructions executable by the programmed processor 20 is provided for rib pairing. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The display 24 is a CRT, LCD, projector, plasma, printer, or other display for displaying two-dimensional images or three-dimensional representations or renderings. The display 24 displays images annotated, colored or otherwise modulated with rib order and/or pairing information. The image on the display 24 represents anatomy, ribs, spine, tissue with ribs, a listing of ribs, an order of ribs, pairing information and/or combinations thereof. The image may be a three-dimensional rendering and represents the paired ribs, such as shown in FIGS. 3-5. The image may be a list without anatomical presentation.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for automated rib ordering and pairing, the method comprising:

receiving a spine location designation and rib location designations for a plurality of ribs;

determining, with a processor, a left side or a right side of the spine location designation for each of the rib location designations;

for the rib location designations on the left side, ordering, with the processor, the rib location designations sequentially;

for the rib location designations on the right side, ordering, with the processor, the rib location designations sequentially; and pairing, with the processor, the rib location designations on the left side with the rib location designations on the right side as a function of the ordering, a spring cost function, and a magnetic cost function.

2. The method of claim 1 wherein receiving comprises receiving a spine centerline as the spine location designation and receiving rib centerlines as the rib location designations.

3. The method of claim 2 wherein at least one of the rib centerlines comprises at least one false centerline and wherein the pairing avoids pairing the at least one false centerline.

4. The method of claim 1 wherein determining comprises:
calculating a centroid for each of the rib location designations; and
determining a sagittal position of the centroid for each of the rib location designations relative to the spine location designation.

5. The method of claim 1 wherein ordering for the left and right sides comprises:
identifying adjacent rib location designations for each of the rib designation locations as a function of axial distance, the axial distance being substantially along the spine location designation;
calculating relative distances between the adjacent rib location designations; and
resolving absolute distance between the adjacent rib location designations as a function of the relative distances.

6. The method of claim 5 wherein calculating comprises calculating as a function of a matrix.

7. The method of claim 1 wherein ordering comprises ordering as a function of multiple points on each of the rib location designations, the ordering using an average distance based on the multiple points.

8. The method of claim 1 wherein pairing as a function of the ordering comprises pairing as a function of absolute axial positions of the rib location designations.

9. The method of claim 1 wherein pairing comprises:
weighting a distance affinity between rib location designations on opposite of the sides as a function of the magnetic cost function; and
weighting axial order as a function of the spring cost function.

10. The method of claim 1 wherein the magnetic cost function comprises left and right side magnetic functions and the spring cost function comprises left and right side spring function, and wherein pairing comprises solving an objective function comprising a sum of the left and right side magnetic functions and the left and right side spring functions.

11. The method of claim 1 further comprising:
displaying an image of ribs, the ribs labeled as a function of the pairing.

12. In a non-transitory computer readable storage medium having stored therein data representing instructions executable by a programmed processor for rib pairing, the storage medium comprising instructions for:
receiving first and second lists of positions of ribs represented in data for left and right sides of a patient, respectively; and
matching ribs on the right side with ribs on the left side as a function of a model of a distance-based affinity between ribs on the left and right sides based on a magnetic attraction energy and of an axial ordering from the lists based on a spring system enforcing the ordering.

13. The non-transitory computer readable storage medium of claim 12 wherein receiving comprises:
identifying adjacent ribs as a function of axial distance, the axial distance being substantially along a spine;
calculating relative distances between the adjacent ribs; and
resolving absolute distances between the adjacent ribs as a function of the relative distances.

14. The non-transitory computer readable storage medium of claim 12 wherein receiving comprises ordering as a function of distances associated with multiple points on each of the ribs, the ordering using an average distance based on the distances.

15. The non-transitory computer readable storage medium of claim 12 wherein matching comprises pairing as a function of left and right side magnetic functions and left and right side spring functions.

16. A system for automated rib ordering and pairing, the system comprising:
a memory configured to store scan data representing ribs of a patient; and
a processor configured to determine an order of the ribs on each of first and second sides and to pair the ribs of the first side with the ribs of the second side as a function of the order on each of the first and second sides and as a function of magnetic and spring functions.

17. The system of claim 16 wherein the processor is configured to pair with the magnetic function modeling a distance-based affinity between the ribs on the first and second sides and with the spring function maintaining the order on each of the first and second sides.

18. The system of claim 16 wherein the processor is configured to pair as the function of the order, the order represented by absolute position of the ribs.

19. The system of claim 16 wherein the magnetic function comprises first and second side magnetic functions, wherein the spring function comprises first and second side spring functions, and wherein the processor is configured to pair by solving for a sum of gradients of the first and second side magnetic functions and the first and second side spring functions.

20. The system of claim 16 wherein the processor is configured to select a combination without false centerlines, the paired ribs being without the false centerlines.

* * * * *